United States Patent [19]

Tzu-Chin

[11] Patent Number: 5,264,956
[45] Date of Patent: Nov. 23, 1993

[54] SCANNER MOUNTING HARDWARE

[75] Inventor: Huang Tzu-Chin, Taipei Hsien, Taiwan

[73] Assignee: Silitek Corporation, Taipei, Taiwan

[21] Appl. No.: 876,161

[22] Filed: Apr. 30, 1992

[51] Int. Cl.⁵ .................... G02B 26/08; G06K 7/10
[52] U.S. Cl. ..................... 359/196; 235/462; 235/472
[58] Field of Search ............... 361/331, 429; 359/205, 359/212, 223, 811, 819, 871, 196; 235/462, 467, 472

[56] References Cited

U.S. PATENT DOCUMENTS

| | | | |
|---|---|---|---|
| 4,387,297 | 6/1983 | Swartz et al. | 235/472 |
| 4,748,319 | 5/1988 | Sasaki et al. | 235/472 |
| 4,896,026 | 1/1990 | Krichever et al. | 235/472 |
| 5,015,833 | 5/1991 | Shepard et al. | 235/472 |
| 5,081,343 | 1/1992 | Chadima et al. | 235/472 |

Primary Examiner—Bruce Y. Arnold
Assistant Examiner—James Phan
Attorney, Agent, or Firm—Lowe, Price, LeBlanc & Becker

[57] ABSTRACT

A scanner comprised of an upper shell connected to a bottom shell to hold an intermediate plate, a scanning lens assembly, a reflector, a LED assembly, and a plurality of printed circuit boards, wherein said scanning lens assembly and said reflector are mounted on said intermediate plate held in between said upper shell and said bottom shell, and said LED assembly is supported on said intermediate plate at a front edge thereof, and therefore said scanning lens assembly, said reflector and said LED assembly are retained in place when said upper and bottom shells are squeezed to deform.

1 Claim, 4 Drawing Sheets

SCANNER MOUNTING HARDWARE

BACKGROUND

The present invention relates to scanners, and more particularly, the present invention relates to a scanner mounting hardware which ensures that the scanning lens assembly, the reflector and the LED assembly are retained in place when the outer shell is squeezed to deform.

FIG. 1 illustrates a scanner mounting hardware according to the prior art, in which the scanning lens assembly, the reflector and the LED assembly and other component parts are directly mounted on the bottom shell thereof. When in use, the outer shell assembly may be squeezed to deform easily. Because the major parts of the scanner are directly mounted on the bottom shell of the outer shell assembly, deforming the outer shell assembly of the scanner may cause the scanning lens assembly, the reflector and the LED assembly to displace. Although the displacement is minor, the problem of scanning distortion still happens. Therefore, the position of the scanning lens assembly shall be frequently corrected. However, adjusting the position of the scanning lens assembly is not easy, and shall be made by a skilled person.

SUMMARY OF THE INVENTION

The present invention has been accomplished to eliminate the aforesaid problems. It is therefore the main object of the present invention to provide a scanner which can firmly retain the scanning lens assembly, the reflector and the LED assembly thereof in place when the outer shell assembly of the scanner is squeezed to deform. According to the present invention, the scanning lens assembly and the reflector are mounted on an intermediate plate held in between the upper shell and the bottom shell of the outer shell assembly thereof, and the LED assembly is supported on the intermediate plate at the front edge thereof, and therefore the scanning lens assembly, the reflector and the LED assembly are still firmly retained in place when the outer shell assembly of the scanner has been squeezed to deform.

DETAILED DESCRIPTION OF THE PREFERRED EMBODIMENT

Figure 1:
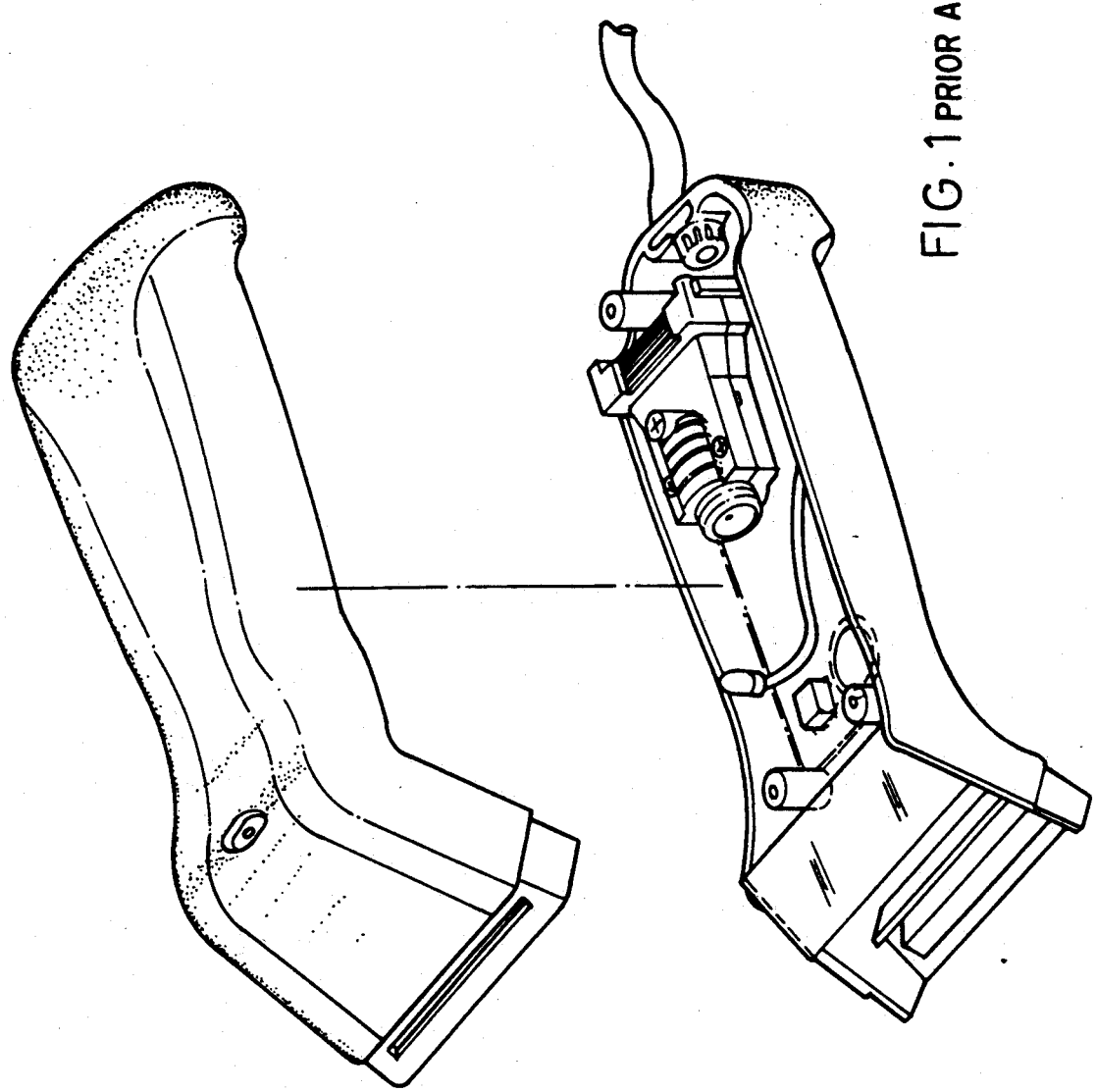
FIG. 1 is an exploded view of the outer shell assembly of a scanner according to the prior art, showing that the component parts of the scanner are mounted on the bottom shell thereof.
Figure 2:
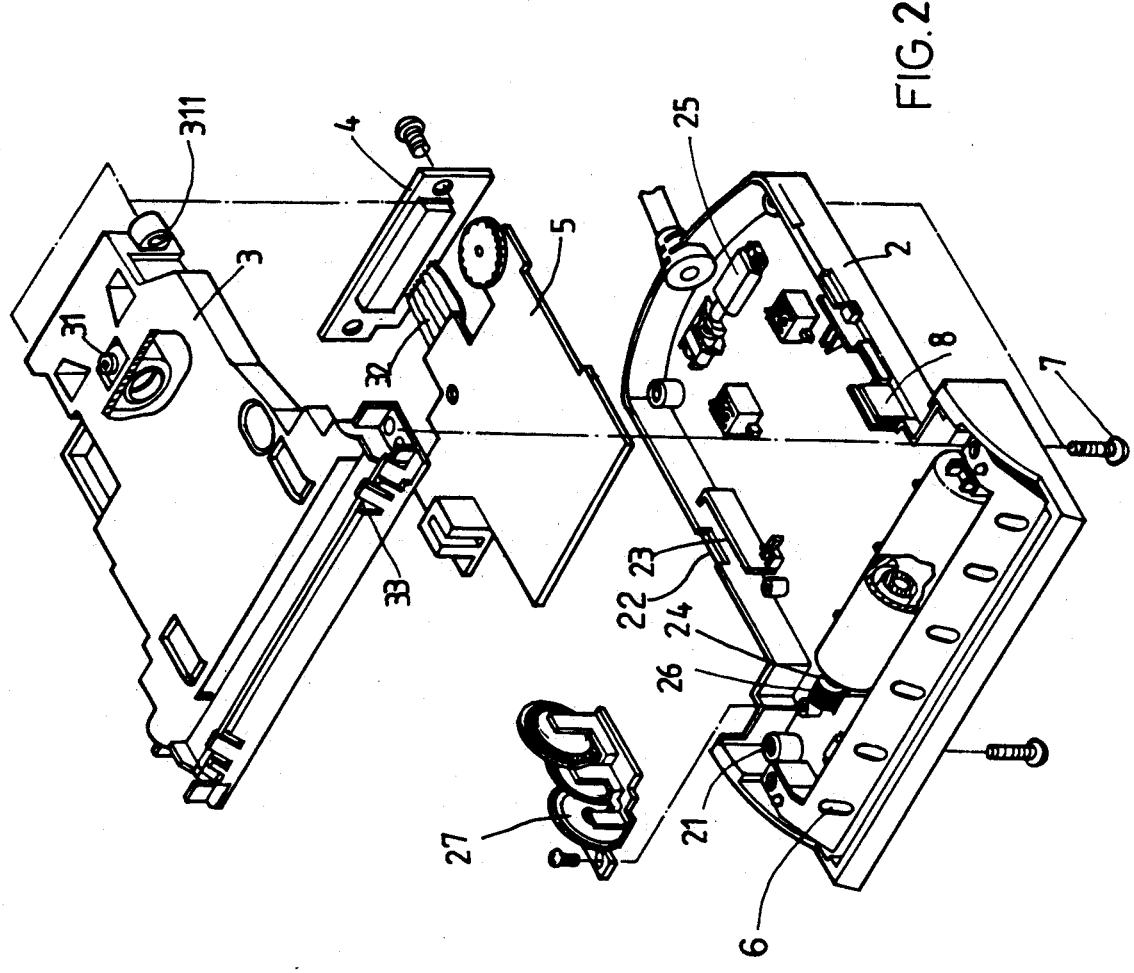
FIG. 2 is an exploded view of the preferred embodiment of the present invention (the upper shell is not included)
Figure 3:
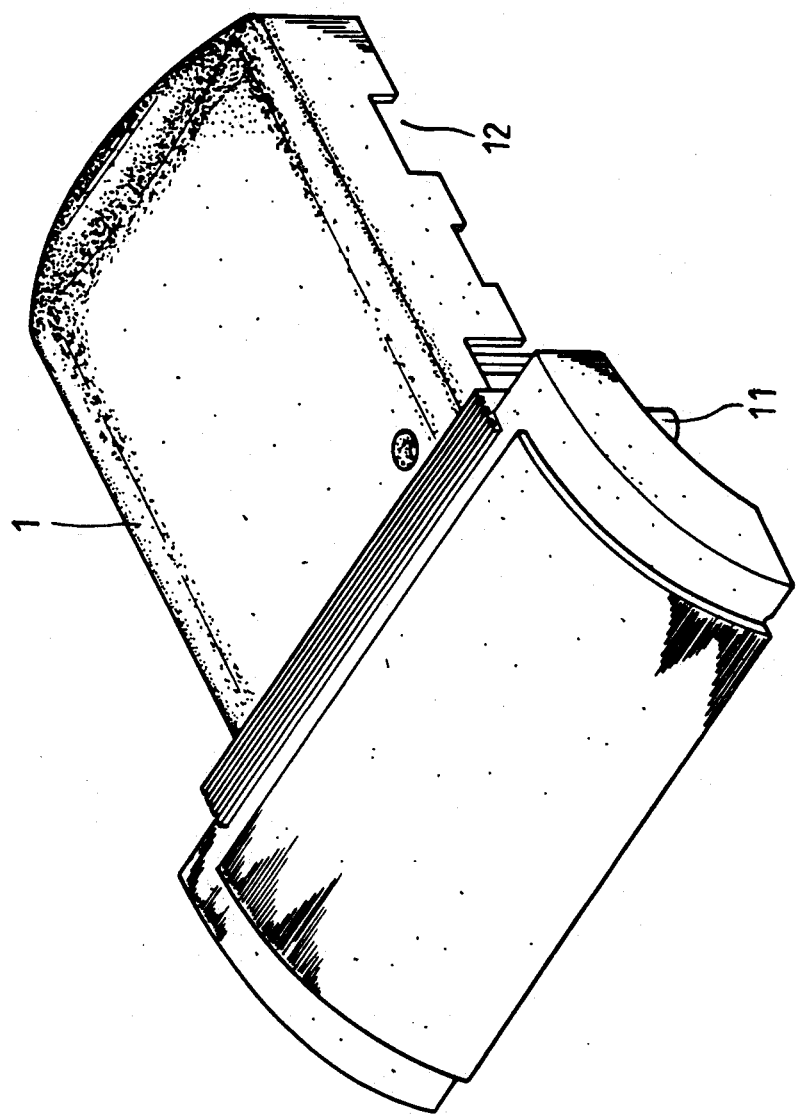
FIG. 3 is an elevational view of the upper shell.
Figure 4:
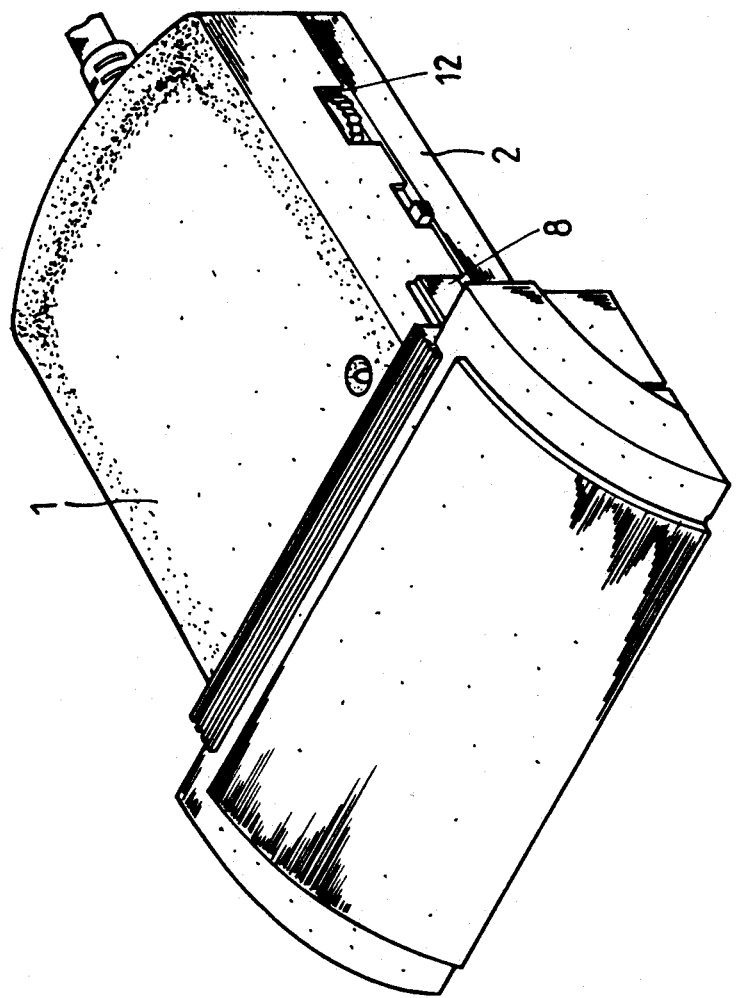
FIG. 4 is an elevational view of a scanner according to the present invention.

Referring to FIGS. 2, 3 and 4, a scanner is generally comprised of an upper shell 1, a bottom shell 2, an intermediate plate 3, two printed circuit boards 4,5, and a LED assembly 6. The upper shell 1 comprises a plurality of bolt holes 11 spaced on the inside, a plurality of side notches 12 that vary in size. The bottom shell 2 comprises a plurality of bolt holes 21 respectively connected to the bolt holes 11 of the upper shell 1 by screws 7, a plurality of side notches 22 corresponding to the side notches 12 on the upper shell 1, a plurality of chambers 23 internally disposed at two opposite sides to hold function switches 8 permitting them to be respectively extended out of the side notches 12,22 for operation, a front roller 24 transversely disposed on the inside at the front, a rear roller 25 transversely disposed on the inside at the back, a gear 26 coupled to the front roller 24 at one end, a gear set 27 engaged with the gear 26. The printed circuit boards 4,5 are fastened inside the bottom shell 2. The LED assembly 6 is mounted on the bottom shell 2 in front of the front roller 24. The intermediate plate 3 comprises a fixed scanning lens assembly 31, which has a bolt hole 311 on the rear end thereof to which the first printed circuit board 4 is connected, and a reflector 33 on the front end thereof. The first printed circuit board 4 is connected to the second printed circuit board by a flat cable 32.

By threading screws 7 into the bolt holes 11, 21, the upper and bottom shells 1,2 are connected together with the intermediate plate 3 secured in therebetween. Because the lens assembly 31 and the reflector 33 are mounted on the intermediate plate 3, and the LED assembly 6 is stopped against the intermediate plate 3, the lens assembly 31, the reflector 33 and the LED assembly 6 will not be caused to displace when the upper and bottom shells 1,2 are forced to deform or crack, and therefore high scanning quality can still be achieved.

What is claimed is:

1. A scanner comprising
   an upper shell and a lower shell interconnected to form the body of said scanner, said scanner having a front and a back;
   a plurality of circuit boards disposed within said body; and
   an intermediate plate disposed within said scanner between said upper and lower shells, said plate having a front edge spaced away from the front of said scanner;
   a scanning lens assembly and a reflector mounted on said intermediate plate, an LED assembly mounted in the lower shell at the front of said scanner and abutting the front edge of said intermediate plate whereby said scanning lens, reflector and LED assembly are stabilized within said body by said intermediate plate.

* * * * *